United States Patent [19]

Koch

[11] 3,850,816

[45] Nov. 26, 1974

[54] CYCLONE
[75] Inventor: Christian Koch, Erlangen, Germany
[73] Assignee: Siemens Aktiengesellschaft, Berlin and Munich, Germany
[22] Filed: Dec. 5, 1973
[21] Appl. No.: 421,783

Related U.S. Application Data
[63] Continuation of Ser. No. 167,968, Aug. 2, 1971, abandoned.

[30] Foreign Application Priority Data
July 31, 1970 Great Britain .................... 2038045

[52] U.S. Cl. .................... 210/512, 209/211, 55/447
[51] Int. Cl. ............................................ B01d 21/26
[58] Field of Search ...... 210/512; 55/204, 205, 447; 209/211

[56] References Cited
UNITED STATES PATENTS

| 3,129,173 | 4/1964 | Schulze | 210/512 |
| 3,306,461 | 2/1967 | Weis | 210/512 |
| 3,370,407 | 2/1968 | Morawski | 210/512 |
| 3,413,776 | 12/1968 | Vytlacil | 210/512 |
| 3,745,752 | 7/1973 | Gallaer | 210/512 |

FOREIGN PATENTS OR APPLICATIONS
918,105   2/1963   Great Britain ...................... 55/204

Primary Examiner—Samih N. Zaharna
Assistant Examiner—F. F. Calvetti
Attorney, Agent, or Firm—Herbert L. Lerner

[57] ABSTRACT

Cyclone for separating specifically heavier substance from flowing media containing the substance includes a cylindrical part, a conical part connected to said cylindrical part, and an inlet duct for the flowing media communicating at an end thereof with the cylindrical part, the end of the inlet duct being generally in the form of a venturi nozzle and including in succession a continuously narrowing first duct part, a second duct part of uniform cross section connected thereto, and a continuously widening third duct part connected to the second duct part, the second duct part having a cross sectional area of at most 0.05 $D^2$, where D is the diameter of the cylindrical part, at least the second and third duct parts being curved spirally about the axis of the cylindrical part and being connected to the cylindrical part so as to supply the flowing media in substantially tangential direction into the cylindrical part.

5 Claims, 2 Drawing Figures

CYCLONE

This is a continuation, of application Ser. No. 167,968, filed Aug. 2, 1971, now abandoned.

My invention relates to cyclone for separating specifically heavy substances from flowing i.e., fluid or fluidized media, and more specifically, to such cyclones having a cylindrical part, a conical part connected to the cylindrical part, and an inlet duct communicating with the cylindrical part.

Cyclones, also referred to as centrifugal separators, are frequently employed for separating specifically heavy substances from flowing media, for example for separating dust from a dust-gas mixture or solid material from a solid material-liquid mixture. Heretofore known cyclones are formed with a cylindrical part with which an inlet duct communicates, and a conical part connected to the cylindrical part. The flowing medium, such as air, for example, is introduced into the cyclone in tangential direction thereto at relatively high speed and is constrained by the cylindrical wall of the cyclone to travel in a circular path therein. Due to the action of centrifugal force, the specifically heavier substance, such as dust particles, for example, are hurled against the wall of the cyclone whereat they are separated and settle, for the most part, downwardly into the conical part of the cyclone. The flowing medium, such as air, for example, travels downwardly in a spiral path near the axis of the cyclone and escapes from an outlet duct. Such cyclones have been described, for example, in a book by Fritz Mode, entitled "Ventilatoranlagen," Third Edition, Berlin 1961, pages 213 to 215. As explained in detail therein, it has been found to be advantageous to relate the main dimensions of a cyclone having a dust-removing efficiency of 80 to 90 percent to the diameter D of the cylindrical part of the cyclone. The equation $D = 1.36 \sqrt{V}$ is applicable thereto, D being measured in cm, and V being the delivery rate by volume of the dust-laden air in m³/hr; it is assumed that the air inlet velocity $v \geq 15$m/sec. The crosssectional area of the inlet duct or tube is about 0.1 $D^2$ for such a cyclone. As has been further noted in the aforementioned book, tests have heretofore established that an air inlet velocity of more than 25m/sec does not produce any appreciable improvement in the efficiency of the cyclone. The aforementioned high dust-removing efficiencies of 80 to 90 percent are achieved only for relatively large particles in the heretofore known cyclones. In contrast thereto, the degree of dust-removing efficieny for particle sizes smaller than 5 $\mu$ markedly decreases in all heretofore known cyclones.

It is accordinly an object of my invention to provide a cyclone wherein the separation is further improved over conventional cyclones and wherein the separating efficiency is increased especially for separating specifically heavier substance having a particle size smaller than 5 $\mu$.

With the foregoing and other objects in view, I provide, in accordance with my invention, cyclone for separating specifically heavier substance from flowing media containing the substance, comprising a cylindrical part, a conical part connected to the cylindrical part, and an inlet duct for the flowing medium containing the substance communicating at an end thereof with the cylindrical part, the end of the inlet duct being generally in the form of a venturi nozzle and including in succession a continuously narrowing first duct part, a second duct part of uniform cross section connected thereto, and a continuously widening third duct part connected to the second duct part, the second duct part having a cross-sectional area of at most 0.05 $D^2$, where D is the diameter of the cylindrical part, at least the second and third duct parts being curved spirally about the axis of the cylindrical part and being connected to the cylindrical part so as to supply the flowing medium containing the substance in substantially tangential direction into the cylindrical part.

By constructing the end of the inlet duct, which communicates with the cylindrical part, generally in the form of a venturi nozzle, the flow velocity of the medium containing the substance in the interior of the inlet duct and, thereby, the inlet velocity thereof into the cylindrical part of the cyclone are greatly increased. Since the second duct part of uniform cross section, which is also the part having the narrowest cross section has a cross-sectional area that is equal at most to 0.05 $D^2$, flow velocities of 30 m/sec and more are attained for otherwise conventional dimensioning of the cyclone. The narrowing first duct part effects acceleration of the flowing medium. The second duct part of uniform cross section serves to form a bunched-together, largely laminar flow. By means of the following, constantly widening third duct part stripping turbulence at the end of this third duct part, and the impact losses, therewith, which could limit the efficiency of the cyclone, are very extensively avoided. Due to the spiral curving of at least the second duct part having uniform cross section and the third duct part having widening cross section, compressionn of the specifically heavier substance is achieved even beforehand in the inlet duct due to the centrifugal force that is produced, which is even further increased due to the high flow velocity.

With the cyclone constructed in accordance with my invention, markedly increased degrees of separating efficiency are attainable for particles of 5$\mu$m or smaller. In connection with the particular construction of the inlet duct of the cyclone of the invention, flow velocities of 30 m/sec and higher thus surprisingly produce even better improvements. This had not been expected at all. As aforementioned, it was believed heretofore that flow velocities over 25 m/sec would not produce any further improvements.

In accordance with another feature of my invention, I provide a cyclone wherein the continuously narrowing first duct part of the inlet duct is curved. This is advantageous in that a precompression of the specifically heavier substance occurs beforehand in this first duct part of the inlet duct.

In accordance with a further feature of the invention, there is provided a cyclone wherein the second duct part of uniform cross section and the continuously widening third duct part of the end of the inlet duct have a rectangular cross section. Due to this construction of the cyclone of the invention, the specifically heavier substance passing from the inlet duct into the cylindrical part over the entire cross section of the outlet opening of the inlet duct clings closely to the wall of the cylindrical part. The continuously narrowing cross section of the first duct part can also be rectangular or change from a circular cross section, for example, into a rectangular cross section. Thereby, the connection of hose lines is facilitated.

In accordance with an additional feature of the invention, there is provided a cyclone wherein the outer wall of the end of the inlet duct extends spirally along the wall of the cylindrical part and merges tangentially into the cylindrical part wall, and the inner wall of the end of the inlet duct corresponds substantially to the wall of the cylindrical duct part and in the continuously widening duct part is drawn into the cylindrical part. In this type of construction, the flow relationships in the cylindrical part are not impaired by possibly disruptive built-in members.

In accordance with another feature of the invention, there is provided a cyclone wherein the degree of separation, especially for particles of very small diameter, can be further improved when the diameter D (measured in cm) of the cylindrical part is substantially $D = \sqrt{V}$ wherein V is the cyclone throughput rate of the flowing medium in m³/hr. With respect to the heretofore known cyclones, with such dimensioning of the diameter of the cylindrical part, the force acting upon the specifically heavier substance is increased even further.

Other features which are considered as characteristic for the invention are set forth in the appended claims.

Although the invention is illustrated and described herein as embodied in cyclone it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figure 1:
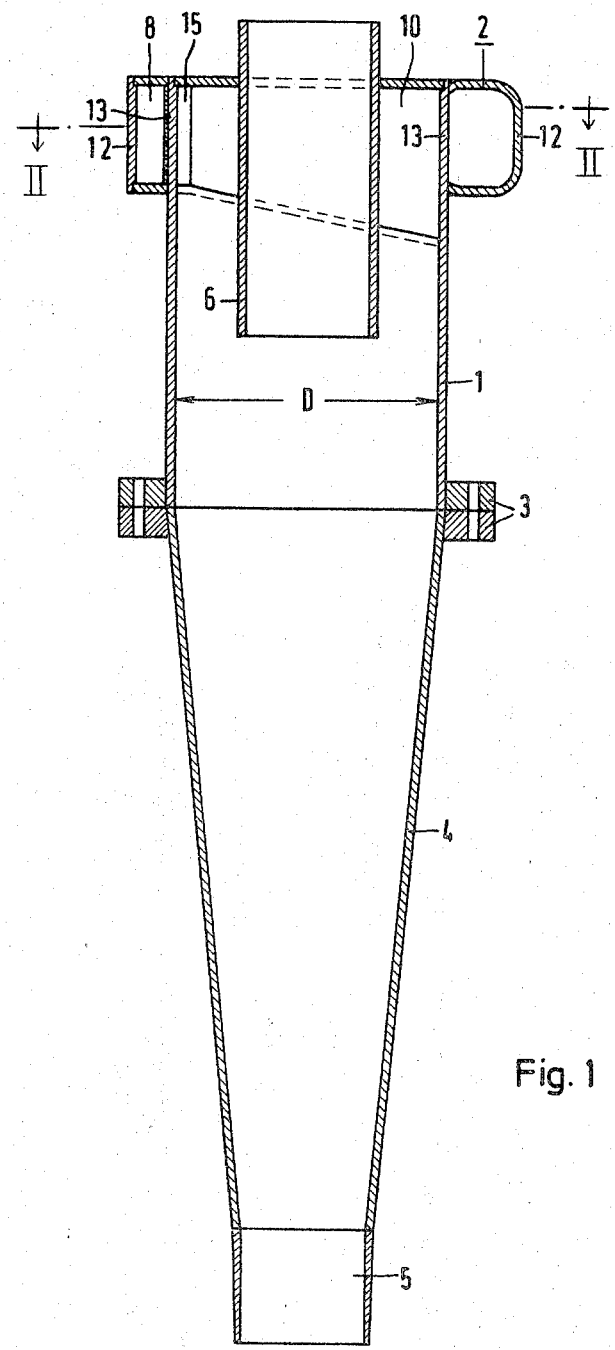
FIG. 1 is a longitudinal sectional view of the cyclone of the invention.

Referring now to the figures of the drawing, there is shown an embodiment of the cyclone of the invention that is formed of a cylindrical part 1, with the interior of which an inlet duct 2 communicates and to which a conical part 4 is attached with the aid of flanges 3, respectively provided on the cylindrical part 1 and the conical part 4 and formed with registering bores in which non-illustrated bolts or rivets, or the like are disposed and suitably secured. The conical part 4 is provided with a lower opening 5 at which, during operation of the cyclone, a collecting vessel, not shown in the figures, can be connected for which the therein separated substance. An outlet duct 6 is further inserted in the cylindrical part 1 of the cyclone to permit the escape therethrough of the flowing medium, such as air, for example, from the cyclone. The mixture from whichthe specifically heavier substance is to be separated, is introduced into the cylindrical part 1 through the inlet duct 2.

Figure 2:
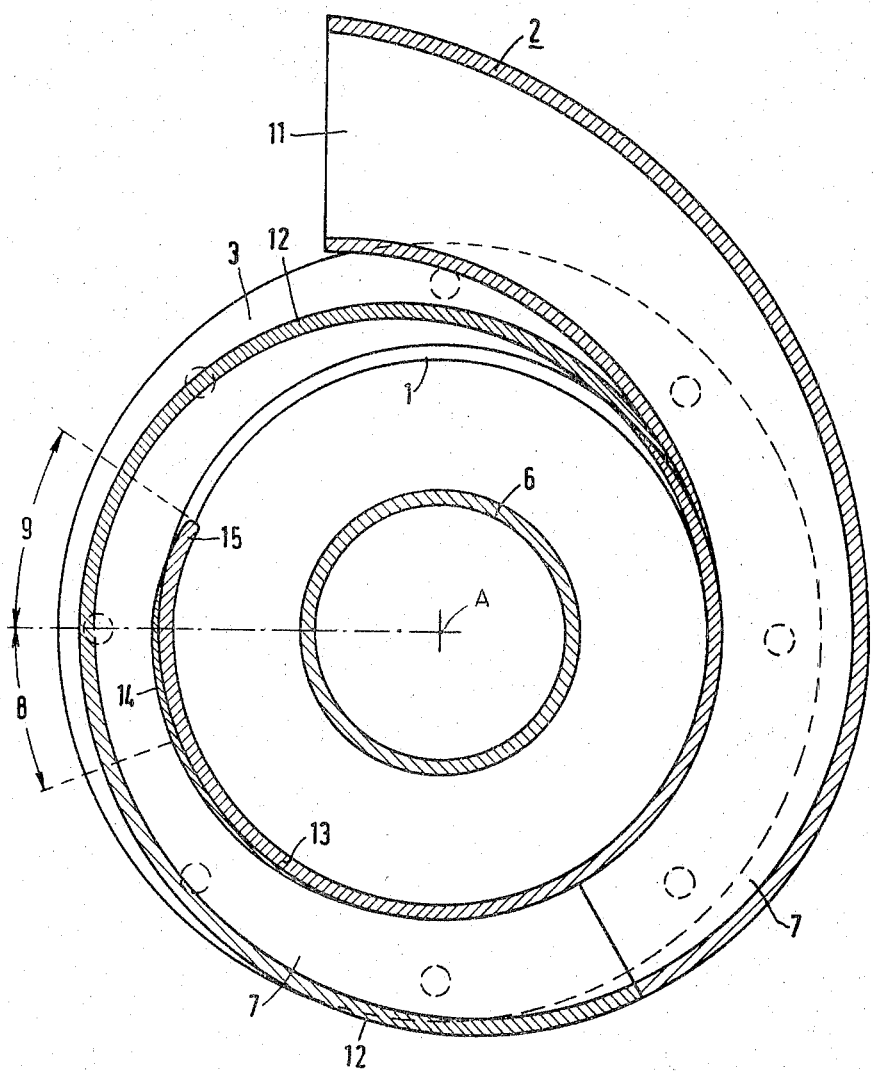
FIG. 2 is an enlarged cross-sectional view of FIG. 1 taken along the line II — II in the direction of the arrows.

The end of the inlet duct 2 which is especially clearly seen in FIG. 2 is constructed in the form of a venturi nozzle. A part 8 having a uniform cross section is connected to a part 7 continuously narrowing in the flow direction of the flowing medium. A continuously widening part 9, in turn, follows the part 8 of uniform cross section. All of the parts of the end of the inlet duct 2 are curved in the form of a spiral about the axis A of the cylindrical part 1 and communicate with and extend substantially tangentially into the cylindrical part 1 through an opening 10 formed in the wall of the cylindrical part 1. The narrowing part 7 of the inlet duct 2 has a circular cross section at the inlet end 11 thereof, that circular cross section being merged into a rectangular cross section at the beginning of the part 8. The parts 8 and 9 have respective rectangular cross sections. The outer wall 12 of the end of the inlet duct 2 extends spirally about the wall of the cylindrical part 1 and merges tangentially therewith. The inner wall 13 of the end of the inlet duct 2 is simultaneously the wall of the cylindrical part 1, which is only provided with a reinforcement at 14 in order more simply to attain the desired cross section. At the end of the continuously widening part 9 of the inlet duct 2, the inner wall 13 is slightly drawn into the interior of the cylindrical part 1 at the location 15.

The cyclone shown in FIGS. 1 and 2 is constructed especially for separating fine dusts from dust-air mixtures. The diameter D of the cylindrical part 1 in cm is selected advantageously so that $D = \sqrt{V}$, and in the special case $D = 0.96 \sqrt{V}$, wherein V is the throughput or flow rate of dust air mixture through the cyclone in m³/hr. The length of the cylindrical part 1 is advantageously about 1.5 D, the length of the conical part 4 is about 2.5 D, and the diameter of the outlet duct 6 is about 0.5 D. The opening 5 of the conical part 4 has a diameter of about 0.48 D, advantageously. The cross section of the part 7 of the inlet duct 2 decreases, in the illustrated embodiment, from about $0.1 D^2$ at the inlet opening 11 to about $0.034 D^2$ of the location of transition to the part 8. The part 8 has a uniform cross section of $0.034 D^2$. The cross section of the part 9 widens from $0.034 D^2$ by about 10 percent to $0.0374 D^2$.

The cross section of the inlet duct can, obviously, also be varied with respect to the afore-indicated values. It is essential, however, that the cross section of the part 8 is not larger than $0.05 D^2$. In addition, the cross section of the part 8 should also, as a rule, be no smaller than about $0.008 D^2$, because formation of strong turbulence may be anticipated below this cross sectional value. With respect to the cross section of the part 8, the cross section of the part 9 should be widened by about 5 to 20 percent so as to eliminate impact losses as much as possible. Moreover, for these reasons, the wall portion 15 should deviate no more than 6° from a tangent disposed at the inner wall of the part 8 at the transition location between the parts 8 and 9.

The curve length of the inner wall of the parts 8 and 9 is about 0.2 D, respectively, in the embodiment of the inventive cyclone shown in FIGS. 1 and 2. The rectangular inner cross sectional area of the part 8, advantageously, has a height of about 0.34 D and a width of about 0.1 D, as viewed in FIG. 1. In part 9, the width widens to about 0.11 D while the height remains the same as in the part 8. The circular inner cross section at the inlet opening 11 of the part 7 has a diameter of about 0.34 D.

In a special embodiment constructed for a dust air mixture throughput or flow rate of 108 m³/hr = 30 liters/sec., the cylindrical part 1 has a diameter of about 10 cm. The remaining measurements are determined in accordance with the indicated relationships. The dust-air mixture is sucked into the cyclone through the inlet duct 2 with the aid of a non-illustrated fan or blower connected to the outlet duct 6. The flow velocity at the circular inlet opening 11 was about 33 m/sec. In the narrowing part 7, the mixture was accelerated to a flow velocity of about 88 m/sec; flowed at this velocity through the part 8 and entered in tangential direction into the cylindrical space at the end of the part 9 at a velocity of about 80 m/sec. The degree of separation for the dust particles in the employed dust-air mixture having a diameter of about 4 $\mu$m or less was considerably higher than 90 percent. The pressure loss, due to the special construction of the end of the inlet duct 2, increases only slightly with respect to the heretofore known cyclones, and in fact, is so low that, the small additional expenditure of compression work in view of the high degree of separation especially for cyclones of small and medium sizes, is virtually of no consequence.

In a further test, liquid was also separated from a liquid air mixture with the afore-described embodiment of the cyclone of the invention ($D = 10$ cm). For this purpose, the inlet opening 11 of the inlet duct 2 was connected through a non-illustrated hose with a normal duct suction nozzle, also non-illustrated. The liquid, which was water for example, was sucked rapidly and completely through the duct suction nozzle and was separated virtually completely from the water-air mixture in the cyclone.

The high velocity of the liquid or solid particles, sucked into the cyclone, in fact, permits operation of the cyclone in a substantially horizontally disposed position thereof.

The inventive cyclone can be modified in various ways with respect to the embodiment thereof shown in FIGS. 1 and 2. For example, the widening of the cross section of the part 9 of the inlet duct 2 can be attained by increasing somewhat the height of the inner cross section of the part 9. It is then unnecessary to draw the inner wall 13 of the part 9 into the cylindrical part 1 at the location 15. Furthermore, for example, with a cyclone wherein at least the duct part having uniform cross section and the continuously widening duct part of the end of the inlet duct can have a rectangular cross section, also the outer wall of the end of the inlet duct can extend spirally about the wall of the cylindrical part and can merge tangentially therewith, while the inner wall of the part having uniform cross section and of the part having widening cross section can be drawn into the cylindrical part. By this type of construction, the radius of curvature of the end of the inlet duct can be further reduced and the centrifugal force acting upon the solid or liquid particles can be increased still further.

In the embodiment shown and described in detail hereinbefore, the dust-air mixture was sucked through the cyclone through a non-illustrated fan or blower connected to the outlet duct 6. Instead of this construction, the fan or blower can be connected in front of the inlet duct 2 and can force the dust-air mixture through the cyclone.

Moreover, it may be advantageous to connect, in parallel, two or more of my inventive cyclones flow-wise into a cyclone battery. The inlet and outlet ducts of the individual cyclones are, respectively, connected, for this purpose, advantageously to a common supply duct for the mixture to be separated and to a common discharge duct for the component of the mixture from which the specifically heavier substance is separated.

The fan or blower, which sucks the mixture through the cyclones, can be located, accordingly, in the common discharge duct. Especially high degrees of separation may be expected with such cyclone batteries.

The cyclone of the invention is suited, especially, as aero cyclones for separating solids or liquids, respectively, from solid-gas and liquid-gas mixtures. Also considerable advantages are expected from the inventive construction with hydrocyclones for separating solids from solid-liquid mixtures or for separating the specifically heavier liquid from liquid mixtures. Preferred fields of use for the aerocyclones are, for example, household and industry dust suction devices or vacuum cleaners for separating fine dusts especially from small quantities of gas. The inventive cyclone, accordingly, is suitable especially for such situations, wherein a fine dust separation must be effected without an electrofilter.

I claim:

1. A cyclone structure for separating specifically a heavier substance from a flowing medium containing such substance, comprising: a cylindrical member, a conical member connected to said cylindrical member, an inlet duct in communication with said cylindrical member for the passage of said medium containing said substance therethrough, said inlet duct having an end portion generally in the form of a venturi nozzle and including, in succession, a continuously narrowing first duct portion, a second duct portion of uniform cross section being connected to said first duct portion, and a continuously widening third duct portion connected to said second duct portion, said second duct portion having the narrowest cross-section namely, a maximum cross-sectional area of 0.05 $D^2$, where D is the diameter of said cylindrical member and at least said second and third duct portions respectively being curved spirally about the axis of and connected to said cylindrical member so as to supply said flowing medium containing such substance, in substantially tangential direction into said cylindrical member of said structure.

2. A cyclone structure according to claim 1, having said continuously narrowing first duct portion of said inlet duct also curved in a spiral around said cylindrical member.

3. A cyclone structure according to claim 1, wherein said second duct portion of uniform cross section and said continuously widening third duct portion respectively merge into rectangular cross sections.

4. A cyclone structure according to claim 3, wherein: said end portion of said inlet duct is provided with an inner and an outer wall, said outer wall extending spirally around the wall of said cylindrical member and merging tangentially therewith, said inner wall corresponding substantially with said wall of said cylindrical member and, partially extending in the radial direction into the interior of said cylindrical member at the end of said continuously widening said third duct portion.

5. A cyclone structure according to claim 1, wherein said diameter D of said cylindrical member measured in cm is equal, substantially, to $\sqrt{V}$, wherein V is the flow rate of said flowing medium through said cyclone structure in m³/hr, and said first, second and third duct portions extend spirally almost completely about said cylindrical member before entering said cylindrical member.

* * * * *